(12) United States Patent
Pei

(10) Patent No.: US 8,316,792 B2
(45) Date of Patent: Nov. 27, 2012

(54) APPARATUS FOR MAKING WORKING ELECTRODE OF DYE-SENSITIZED SOLAR CELL

(75) Inventor: Shao-Kai Pei, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 325 days.

(21) Appl. No.: 12/788,306

(22) Filed: May 27, 2010

(65) Prior Publication Data
US 2011/0155053 A1 Jun. 30, 2011

(30) Foreign Application Priority Data

Dec. 31, 2009 (CN) .......................... 2009 1 0312772

(51) Int. Cl.
*B05C 1/00* (2006.01)
*B05C 5/00* (2006.01)
*B05B 17/00* (2006.01)
*B05B 7/06* (2006.01)
*B05B 3/00* (2006.01)
*B05B 9/06* (2006.01)

(52) U.S. Cl. ......... 118/206; 118/304; 118/315; 118/323
(58) Field of Classification Search .................. None
See application file for complete search history.

(56) References Cited

U.S. PATENT DOCUMENTS

| 6,231,732 B1 * | 5/2001 | Hollars et al. ........... 204/298.26 |
| 6,797,066 B2 * | 9/2004 | Yoshino et al. ............... 118/500 |
| 2008/0305269 A1 * | 12/2008 | Sager et al. ................ 427/383.3 |

* cited by examiner

*Primary Examiner* — Dah-Wei Yuan
*Assistant Examiner* — Jethro Pence
(74) *Attorney, Agent, or Firm* — Altis Law Group, Inc.

(57) ABSTRACT

An apparatus for making a working electrode of a dye-sensitized solar cell is provided. The apparatus includes a columnar body, a rotatable mechanism rotatably received in the columnar body, and a cover enclosing the columnar body. Accommodating grooves are formed in the columnar body configured to accommodate substrates. The rotatable mechanism includes a containing chamber, rollers, and nozzles. The nozzles are configured for jetting the slurry from the containing chamber to the accommodating grooves. The rollers are independently rotatable and configured for rolling the slurry on the substrates. The cover has feeding tubes and exporting tubes extending therethrough. The feeding tubes are in communication with the containing chamber and configured for feeding the slurry to the containing chamber. The exporting tubes are in communication with the columnar body and configured for evacuating excess slurry from the columnar body.

13 Claims, 5 Drawing Sheets

APPARATUS FOR MAKING WORKING ELECTRODE OF DYE-SENSITIZED SOLAR CELL

BACKGROUND

1. Technical Field

The present disclosure relates to apparatuses for making working electrodes of dye-sensitized solar cells.

2. Description of Related Art

Dye-sensitized solar cells each have a substantially sandwich-like structure, which includes a working electrode, an electrolyte and an opposite electrode. The working electrode usually includes a substrate, a titanium dioxide (TiO2) layer adhered on the substrate, and a photosensitive dye layer formed on the TiO2 layer. The TiO2 is porous, and the photosensitive dye may be inserted into the porous TiO2. Under sunlight, the photosensitive dye absorbs energy from the sunlight and produces electrons. The electrolyte includes oxidant and reducing agent pairs, e.g., $I_2$ and $I^-$.

A conventional method for making the working electrode is employed on a production line. That is, a substrate is carried to a first station to be coated with a TiO2 layer, then the substrate is carried to a second station to be coated with a photosensitive dye layer. However, in this way, the substrate has to be conveyed from one station to another and is thus exposed to possible contamination.

What is needed, therefore, is an apparatus for making a working electrode of a dye-sensitized solar cell, which can overcome the above shortcomings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENTS

Figure 1:
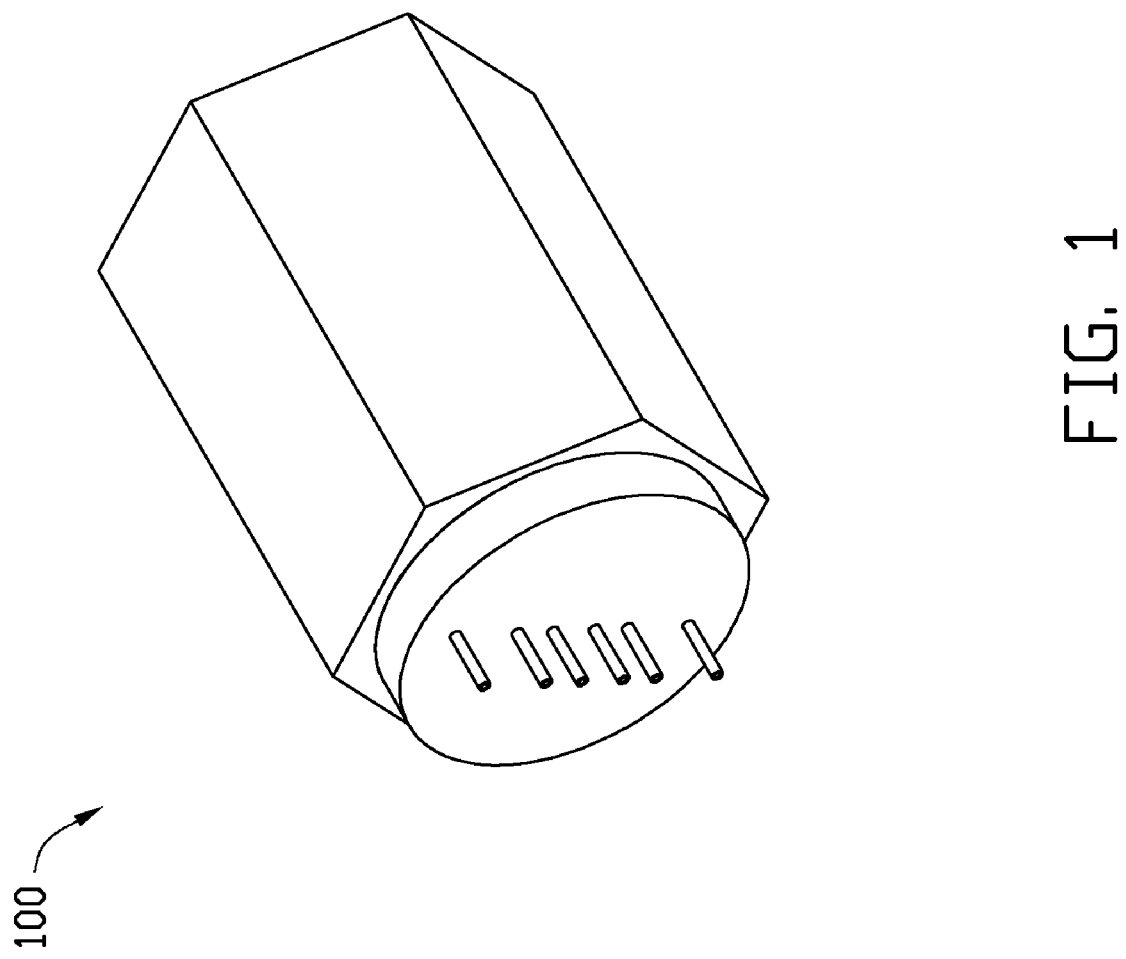
FIG. 1 is a schematic isometric view of an apparatus for making an working electrode of a dye-sensitized solar cell in accordance with a first embodiment.
Figure 2:
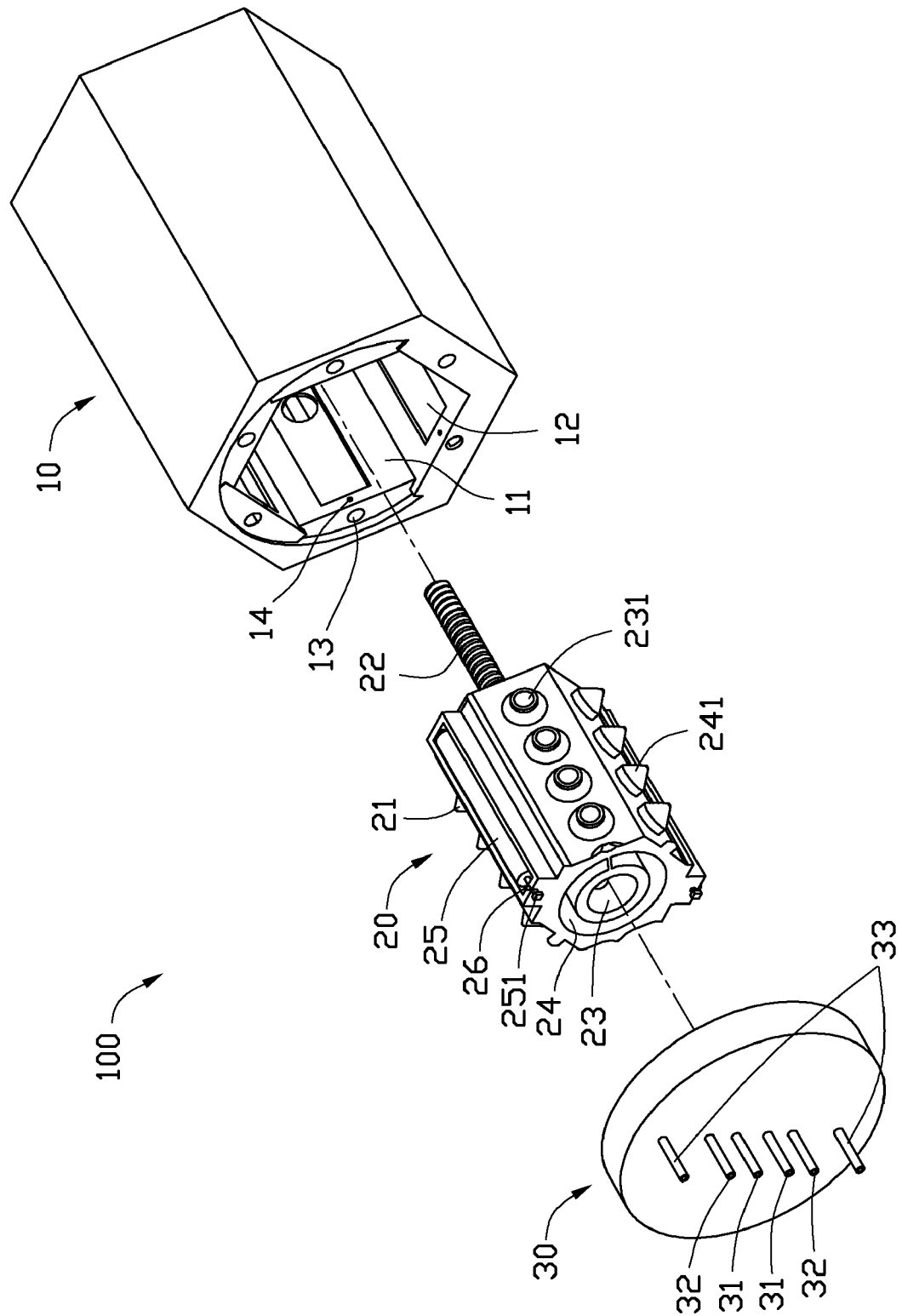
FIG. 2 is a disassembled isometric view of the apparatus of FIG. 1.
Figure 3:
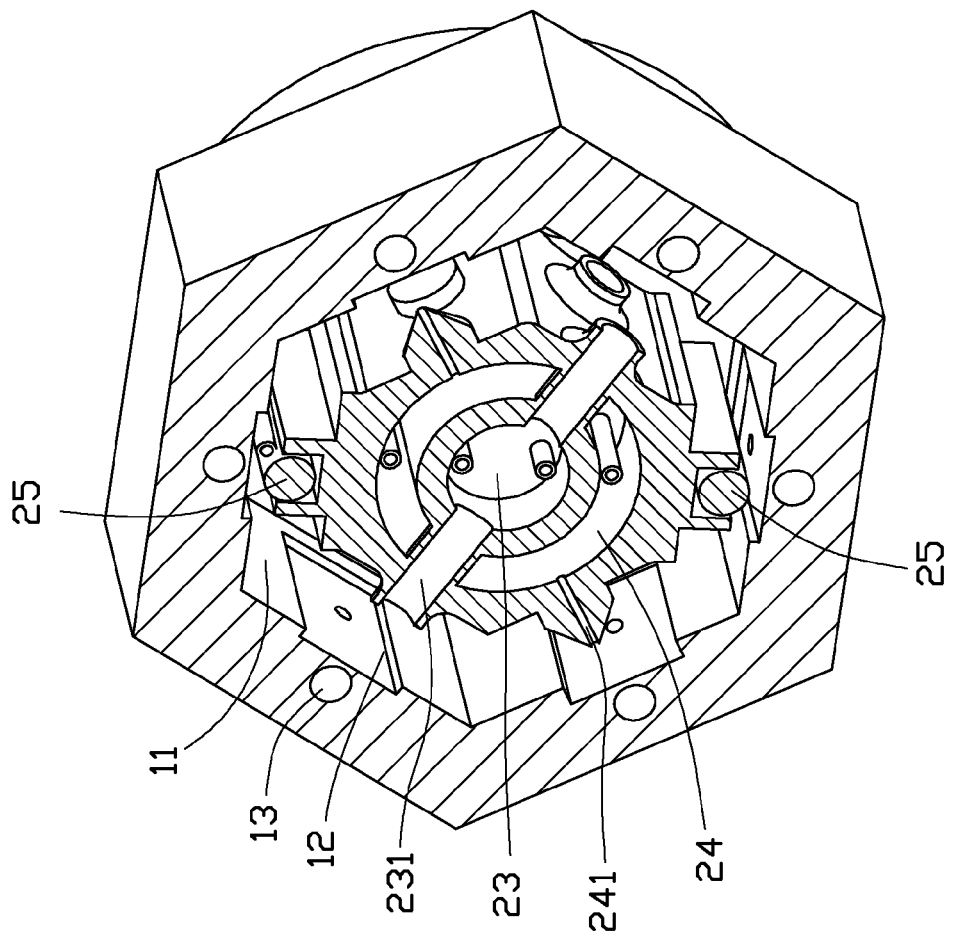
FIG. 3 is a cross-sectional view of the apparatus of FIG. 1 along a radius direction thereof.
Figure 4:
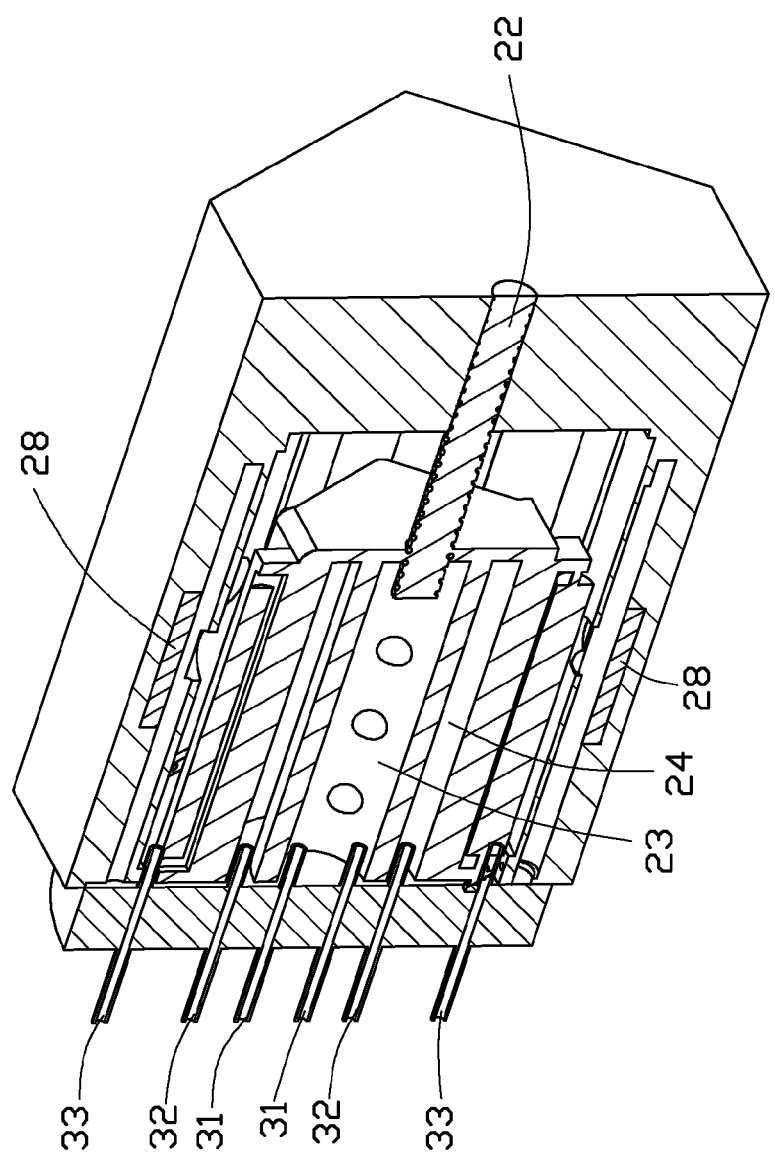
FIG. 4 is another cross-sectional view of the apparatus of FIG. 1 along a lengthwise direction thereof.

Embodiments of the present apparatus will now be described in detail below and with reference to the drawings.

Referring to FIGS. 1 to 4, an apparatus 100 for making a working electrode of a dye-sensitized solar cell in accordance with a first embodiment, is provided. The apparatus 100 includes a columnar body 10, a rotatable mechanism 20 received in the columnar body 10, and a cover 30 enclosing the columnar body 10.

The columnar body 10 is—open at one end, and has a working space 11 defined therein. In the present embodiment, the columnar body 10 is regular hexagonal, and the working space 11 is in the same shape as the columnar body 10. A plurality of accommodating grooves 12 are formed in the inner wall of the working space 11, and are spaced apart from each other. In the present embodiment, there are six accommodating grooves 12, and the accommodating grooves 12 are respectively defined in six surfaces of the working space 11. The accommodating grooves 12 are capable of accommodating six substrates which are to be made into working electrodes of dye-sensitized solar cells. The substrates may be made of glass and can have a conductive oxide film coated thereon before they are placed in the accommodating grooves 12.

In order to further fix the substrates in the accommodating grooves 12, a plurality of vacuum holes 13 corresponding to and in communication with the accommodating grooves 12 are formed in the columnar body 10, respectively. The vacuum holes 13 are attached to a vacuum device (not shown), and while the vacuum device is operation suction of the vacuum holes hold the substrates firmly fixed in the accommodating grooves 12.

The rotatable mechanism 20 is received in the working space 11. The rotatable mechanism 20 mainly includes a driving axle 22 and a driven portion 21 rotated by the driving axle 22.

The driven portion 21 includes, coaxially arranged, a first containing chamber 23 and a second containing chamber 24, with the second containing chamber 24 received in but not in communication with the first containing chamber 23. The first and second containing chambers 23, 24 are configured to contain different materials which are needed in making the working electrode of the dye-sensitized solar cell. In the present embodiment, the first containing chamber 23 is configured to contain a photosensitive dye slurry, and the second containing chamber 24 is configured to contain a titanium dioxide (TiO2) slurry.

A plurality of first nozzles 231 and a plurality of second nozzles 241 are formed on the driven portion 21, with four first nozzles 231 arranged in a line, and four second nozzles 241 arranged in a line. The first nozzles 231 are in communication with the first containing chamber 23, and the second nozzles 241 are in communication with the second containing chamber 24. The first nozzles 231 are larger than the second nozzles 241 (see FIG. 3).

In the present embodiment, there are two rollers 25 mounted on the driven portion 21. In other embodiments, only one roller 25 may be used. Each of the rollers 25 can be rotated relative to the driven portion 21 by a driving device 251 mounted on the driven portion 21. Adjacent to each of the rollers 25 is an infrared light emitting device 26 mounted on the driven portion 21. A plurality of infrared light receiving devices 14 corresponding to the accommodating grooves 12 are mounted on the columnar body 10.

In application, a controller (not shown) can be applied in the apparatus 100 to control the driven portion 21 and the rollers 25 to rotate and stop. When the rotatable mechanism 20 is rotated to a position where the rollers 25 aim at the substrates in the accommodating grooves 12, two of the infrared light receiving devices 14, which the infrared light emitting devices 26 face, will receive signals from the infrared light emitting devices 26. Then, the controller will control the driven portion 21 to stop, and control the rollers 25 to rotate a predetermined time based on the signals received by the infrared light receiving devices 14. After that, the rollers 25 are stopped, and the driven portion 21 is rotated again or is stopped according to need.

The cover 30 is configured to enclose the working space 11 of the columnar body 10. The cover 30 has two first feeding tubes 31, two second feeding tubes 32, and two exporting tubes 33 extended therethrough. The first feeding tubes 31 are in communication with the first containing chamber 23, and the second feeding tubes 32 are in communication with the second containing chamber 24. The exporting tubes 33 are in communication with the working space 11.

In making the working electrode of the dye-sensitized solar cell, first, the rotatable mechanism 20 is rotated in the working space 11 as described above, then the TiO2 slurry is fed into the second containing chamber 24 by the second feeding tubes 32 and is jetted out to the substrates by the second nozzles 241. Second, the driven portion 21 is controlled to stop and the rollers 25 are rotated. The two rollers 25 roll the TiO2 slurry on two substrates at a time while the substrates are rotated until all of the substrates are finished. The rollers 25 ensure the TiO2 slurry is uniformly applied on the substrates, thus forming a TiO2 layer on the substrates. Third, the photosensitive dye slurry is fed into the first containing chamber 23 through the first feeding tubes 31 and is jetted out to the working space 11 by the first nozzles 231. This step is to immerse the substrates in the photosensitive dye slurry, thereby forming a photosensitive dye layer on the TiO2 layer. As the TiO2 is porous, the photosensitive dye will work into the pores of the TiO2. After several hours, the excess photosensitive dye slurry and the TiO2 slurry remaining in the working space 11 is evacuated by the exporting tubes 33.

Each of the accommodating grooves 12 has a heating device 28 arranged adjacent thereto. The heating device 28 is configured to heat the substrates, thereby drying the photosensitive dye layer and the TiO2 layer. In this way, a plurality of working electrodes which could be used in dye-sensitized solar cells is produced.

The working electrode made by the above apparatus and method, can be used in the production of dye-sensitized solar cells.

Figure 5:
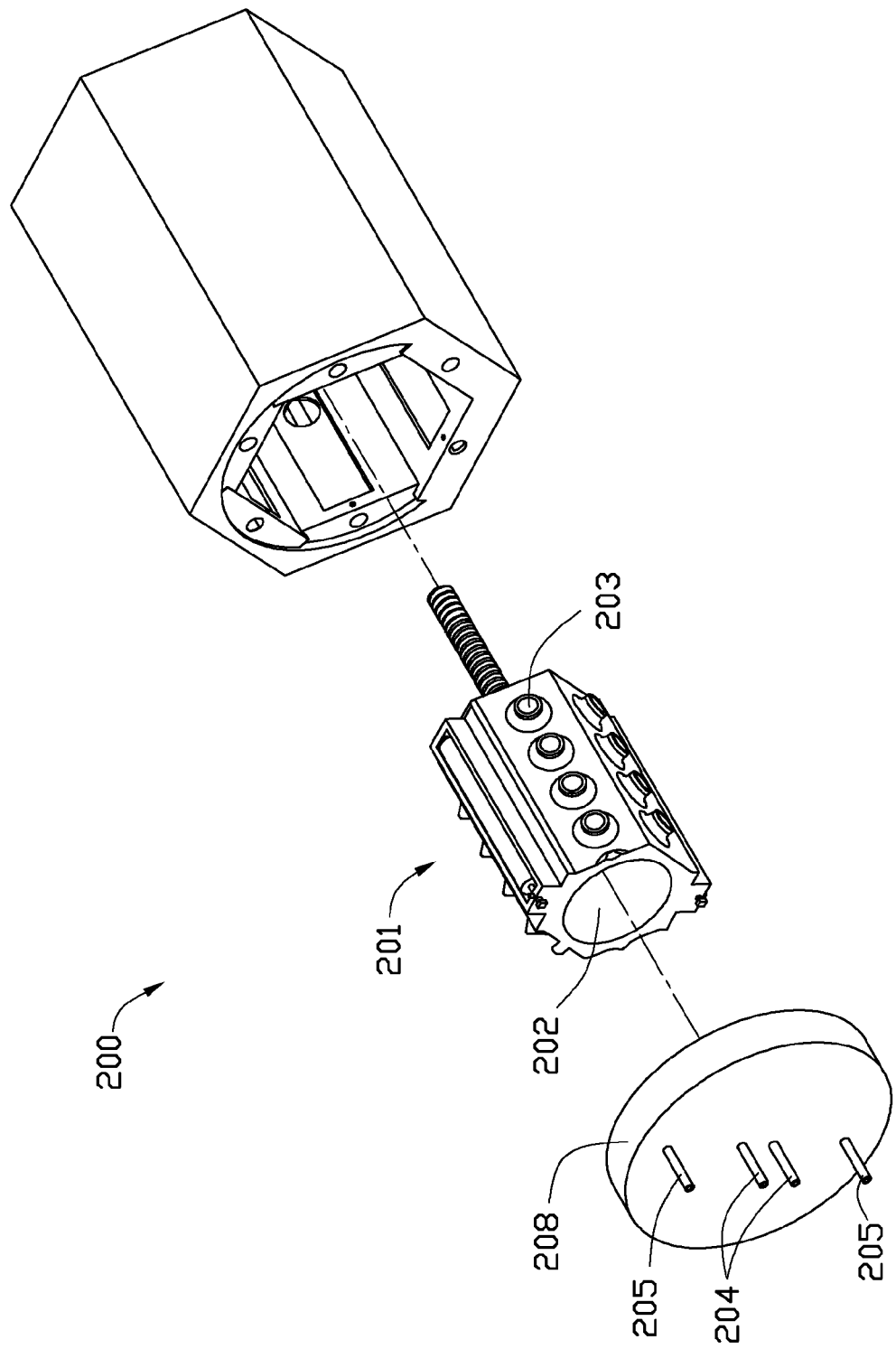
FIG. 5 is a schematic isometric view of an apparatus for making a working electrode of a dye-sensitized solar cell in accordance with a second embodiment.

Referring to FIG. 5, an apparatus 200 for making a working electrode of a dye-sensitized solar cell in accordance with a second embodiment, is provided. The apparatus 200 is essentially similar to the apparatus 100 illustrated above, however, a rotatable mechanism 201 which has only one containing chamber 202 is employed. A plurality of same sized nozzles 203 is formed on the containing chamber 202. Two feeding tubes 204 and two exporting tubes 205 are formed on a cover 208. The TiO2 slurry and the photosensitive dye slurry can be fed in order into the containing chamber 202 by the feeding tubes 204.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for making a working electrode of a dye-sensitized solar cell, the working electrode comprising a substrate, a titanium dioxide layer formed on the substrate and a photosensitive dye layer formed on the titanium dioxide layer, the apparatus comprising:

a columnar body, the columnar body being opened at one end thereof and having a working space defined therein, the columnar body having an accommodating groove formed in an inner wall of the working space, the accommodating groove configured for accommodating a substrate;

a rotatable mechanism rotatably received in the working space, the rotatable mechanism comprising a first containing chamber, a second containing chamber coaxially arranged with the first containing chamber, a plurality of first nozzles in communication with the first containing chamber and a plurality of second nozzles in communication with the second containing chamber, the first containing chamber configured for containing one of a titanium dioxide slurry and a photosensitive dye slurry, the second containing chamber configured for containing the other of the titanium dioxide slurry and the photosensitive dye slurry, the first nozzles configured for jetting the one of the titanium dioxide slurry and the photosensitive dye slurry from the first containing chamber to the substrate, the second nozzles configured for jetting the other of the titanium dioxide slurry and the photosensitive dye slurry from the second containing chamber to the working space; and a cover enclosing the columnar body, the cover having a first feeding tube and a second feeding tube extending therethrough, the first feeding tube in communication with the first containing chamber and configured for feeding the one of the titanium dioxide slurry and the photosensitive dye slurry to the first containing chamber, the second feeding tube in communication with the second containing chamber and configured for feeding the other of the titanium dioxide slurry and the photosensitive dye slurry to the second containing chamber.

2. The apparatus of claim 1, wherein the rotatable mechanism further comprises a roller mounted thereon, and the roller is independently rotatable and configured for rolling the titanium dioxide slurry on the substrate.

3. The apparatus of claim 1, wherein the working space is regular hexagon columnar and has six sides, and the accommodating groove is located at one of the sides.

4. The apparatus of claim 1, wherein the columnar body further comprises a vacuum hole in communication with the accommodating groove.

5. The apparatus of claim 1, wherein the columnar body further comprises a heating device mounted therein, adjacent to the accommodating groove.

6. The apparatus of claim 1, wherein the cover further comprises an exporting tube extending therethrough, the exporting tube in communication with the working space.

7. The apparatus of claim 1, wherein the second containing chamber is received in the first containing chamber.

8. The apparatus of claim 1, wherein the plurality of the first nozzles are arranged in a line, and the plurality of the second nozzles are arranged in a line.

9. An apparatus for making a working electrode of a dye-sensitized solar cell, the apparatus comprising:

a columnar body, the columnar body being one end-opened and having a working space defined therein, the columnar body having a plurality of accommodating grooves formed in an inner wall of the working space, each of the accommodating grooves configured for accommodating a substrate;

a rotatable mechanism rotatably received in the working space, the rotatable mechanism comprising a containing chamber, a plurality of rollers, and a plurality of nozzles in communication with the containing chamber, the containing chamber configured for containing a slurry, the nozzles configured for jetting the slurry from the containing chamber to the accommodating grooves, the rollers being independently rotatable and configured for rolling the slurry on the substrates; and a cover enclosing the columnar body, the cover having a plurality of feeding tubes, and a plurality of exporting tubes extending therethrough, the feeding tubes in communication with the containing chamber and configured for feeding the slurry to the containing chamber, the exporting tubes in communication with the working space and configured for exporting out the slurry from the working space.

10. The apparatus of claim 9, wherein the working space is regular hexagon columnar and has six sides, and each of the accommodating grooves is located at one of the sides.

11. The apparatus of claim 9, wherein the columnar body further comprises a plurality of vacuum holes each in communication with one of the accommodating grooves.

12. The apparatus of claim 9, wherein the columnar body further comprises a plurality of heating devices each being adjacent to one of the accommodating grooves.

13. The apparatus of claim 9, wherein a plurality of the nozzles are arranged in a line.

\* \* \* \* \*